United States Patent [19]

Takeno et al.

[11] Patent Number: 5,001,033
[45] Date of Patent: Mar. 19, 1991

[54] PHOTOGRAPHIC ELEMENT WITH SPECIFIC SUPPORT STIFFNESS

[75] Inventors: Kazuma Takeno; Takeshi Shibata, both of Kanagawa, Japan

[73] Assignee: Fuji Photo Film Co., Ltd., Kanagawa, Japan

[21] Appl. No.: 508,435

[22] Filed: Apr. 13, 1990

[30] Foreign Application Priority Data

Apr. 14, 1989 [JP] Japan ................................. 1-94663

[51] Int. Cl.⁵ .................... G03C 5/54; G03C 1/86; G03C 1/87; G03C 1/88
[52] U.S. Cl. ................................ 430/203; 430/207; 430/212; 430/496; 430/523; 430/538; 430/939
[58] Field of Search ............... 430/203, 207, 212, 496, 430/523, 538, 939

[56] References Cited

U.S. PATENT DOCUMENTS

| | | | |
|---|---|---|---|
| 4,868,088 | 9/1989 | Aono et al. | 430/203 |
| 4,883,738 | 11/1989 | Yamada | 430/939 |
| 4,921,781 | 5/1990 | Takamuki | 430/538 |
| 4,952,969 | 8/1990 | Hara | 430/203 |

*Primary Examiner*—Richard L. Schilling
*Attorney, Agent, or Firm*—Sughrue, Mion, Zinn, Macpeak & Seas

[57] ABSTRACT

A photographic element which is adapted for an image-forming process using a thermal-developing-process image-forming apparatus equipped with rollers for conveying photographic elements capable of forming images by thermal development and which comprises a support having a stiffness in the machine direction of 4.0 to 5.0 g.cm and a stiffness in the transverse direction of 2.9 to 3.4 g.cm.

4 Claims, 1 Drawing Sheet

PHOTOGRAPHIC ELEMENT WITH SPECIFIC SUPPORT STIFFNESS

FIELD OF THE INVENTION

This invention relates to a photographic element capable of forming an image by thermal development and, particularly, to an improvement of a photographic element adapted for forming an image with conveying a thermally developable light-sensitive element which forms an imagewise distribution of a mobile dye by thermal development and a dye-immobilizing element which receives the mobile dye.

BACKGROUND OF THE INVENTION

Many processes have been proposed for forming a dye image (color image) by thermal development. With a process of forming a color image by binding an oxidation product of a developing agent with a coupler, U.S. Pat. No. 3,531,286 discloses a combination of a p-phenylenediamine type reducing agent and a phenolic coupler or an active methylene coupler, U.S. Pat. No. 3,761,270 discloses p-aminophenol type reducing agents, Belgian Patent No. 802,519 and Research Disclosure, Sept. 1975, pp. 31–32 disclose sulfonamidophenol type reducing agents, and U.S. Pat. No. 4,021,240 discloses a combination of a sulfonamidophenol type reducing agent and a 4-equivalent coupler.

However, these processes have the defect that silver-stained color images result since an image of reduced silver and a color image are formed at the same time in exposed portions after thermal development.

In order to overcome this defect, it has been proposed to remove the silver image by some type of liquid processing, or to transfer only the dye image onto a sheet having other layers such as an image-receiving layer. The latter process, however, has the defect that it is difficult to discriminate the dye from an unreacted reactant and transfer only the dye.

Furthermore, the above-described processes involve the defects that they generally require a comparatively prolonged developing time and that resulting images have a seriously high fog and a low image density.

In order to overcome these defects, the following processes have been proposed, for example: A process of imagewise releasing a mobile dye by heat and transferring this mobile dye to a dye-immobilizing element having a mordant with the aid of a solvent such as water; a process of transferring the dye to a dye-immobilizing element with the aid of a high-boiling organic solvent; a process of transferring the dye to a dye-immobilizing element with the aid of a hydrophilic thermal solvent incorporated in the dye-immobilizing element; and a process of using a heat-diffusible or heat-sublimable dye as the mobile dye and transferring it to a dye-receiving material such as a support (U.S. Pat. No. 4,463,079, U.S. Patent 4,474,867, U.S. Pat. No. 4,478,927, U.S. Pat. No. 4,507,380, U.S. Pat. No. 4,500,626, U.S. Pat. No. 4,483,914, JP-A-58-149046 (the term "JP-A") as used herein means an "unexamined published Japanese patent application"), JP-A-58-149047, JP-A-59-152440, JP-A-59-154445,JP-A-59-165054,JP-A-59-180548,JP-A-59-168439, JP-A-59-174832,JP-A-59-174833,JP-A-59-174834,JP-A-59-174835, etc.).

In the above-described image-forming processes, a light-sensitive element having at least a light-sensitive silver halide, a binder, and a dye-providing substance is used for producing or releasing a mobile dye, and a dye-immobilizing element having at least one dye-immobilizing layer is used for receiving and immobilizing the produced or released mobile dye. However, in a low-moisture environment, the light-sensitive element and the image-immobilizing element can curl in such a manner that both edges thereof become higher than the horizontal plane when placed with the light-sensitive layer or the dye-immobilizing layer upward, since the hydrophilic colloid contained in the light-sensitive layer or the dye-immobilizing layer contracts in the low-moisture environment. On the other hand, in a high-moisture environment, the light-sensitive layer or the dye-immobilizing layer stretches because of the absorption of moisture by the hydrophilic colloid contained in the light-sensitive layer or the dye-immobilizing layer and, when placed with the light-sensitive layer or the dye-immobilizing layer downward, the light-sensitive element or the image-immobilizing element can curl in such a manner that both edges thereof become higher than the horizontal plane.

When a curled light-sensitive element or a curled dye-immobilizing element is superposed on each other, there results an insufficient contact therebetween because of an uneven superposition or presence of air between the two elements. As a result, the development or transfer is partially delayed, leading to the formation of uneven images with deteriorated image quality.

In order to remove this curling, a backing layer is coated on the back side (opposite side to the side on which a light-sensitive layer or a dye-immobilizing layer exists) of the support of a light-sensitive element or a dye-immobilizing element. However, while the light-sensitive layer or the image-immobilizing layer undergoes stretching of the coated layers while being conveyed in a heat-developing machine because the layers are wet by a transfer solvent such as water, the backing layer tends to shrink since it is heated by heating rollers or the like and becomes dried.

In accordance with the present invention, it has been found that the above problems can be prevented by selecting a proper stiffness of a support of a light-sensitive element and/or a support of a dye-immobilizing element.

That is, in a system where heating is conducted with simultaneously conveying materials to be heated, for example, a heating apparatus using multi-stage heating rollers, curling of the light-sensitive element or the dye-immobilizing element can not be prevented during heating, since the heating apparatus is not of a type in which heating is conducted with pressing the light-sensitive element and the dye-immobilizing element throughout the heating processing.

If the light-sensitive element or the dye-immobilizing element curls during heating, air gets into the space formed between the two elements to inhibit the transfer of dyes or generates a fold at the front end of the light-sensitive element and/or the dye-immobilizing element in the direction of the conveyance of the elements.

SUMMARY OF THE INVENTION

It is, therefore, an object of the present invention to provide a photographic element adapted for use in an image-forming process which prevents air from getting into the space between the two elements, and prevents the front end of an image from being folded or curved.

This and other objects of the present invention will become apparent from the following description thereof.

The above-described and other objects of the present invention are attained by a photographic element, which is adapted for an image-forming process using a thermal-developing-process image-forming apparatus equipped with rollers for conveying photographic elements capable of forming images by thermal development, and which comprises a support having a stiffness in the machine direction of 4.0 to 5.0 g.cm and a stiffness in the transverse direction of 2.9 to 3.4 g.cm.

DETAILED DESCRIPTION OF THE INVENTION

Figure 1:
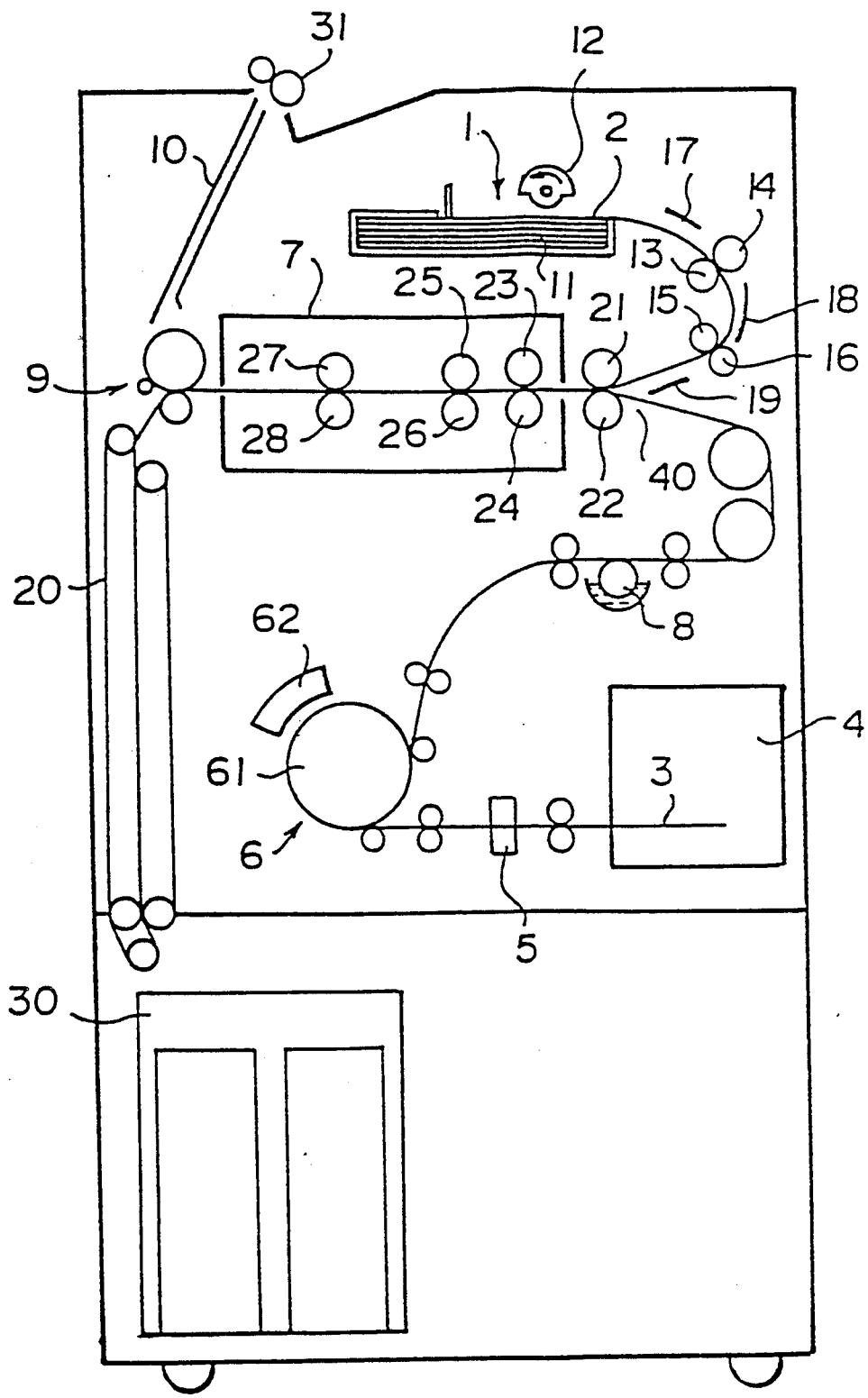
FIG. 1 is a schematic view of an embodiment of a thermal-development-process image-forming apparatus to be used for the image-forming process of the present invention.

In the above description, the term "photographic element" refers to a thermally developable light-sensitive element, a dye-immobilizing element, and a photographic material in which a thermally developable light-sensitive layer and a dye-immobilizing layer are provided on the same support.

The thermal developable light-sensitive element can give an imagewise distribution of a mobile dye by the thermal development. The dye-immobilizing element can receive a diffusible dye (a mobile dye) from a thermal developable light-sensitive element.

The stiffness in the present invention was measured by using Taber stiffness tester (Taber stiffness tester ST-201, produced by Tester Sangyo Corporation). The measurement was carried out according to JIS P8125 revised in 1976 (which corresponds to ISO 2493-1973) except that the measurement was carried out in a test room of 25° C. temperature and 50% relative humidity. "Stiffness" is defined as the bending moment in gf.cm necessary to bend, at a fixed speed (180±40°/minute), the free end of a 38 mm wide test piece, cantilevered at clamped other end, 15°, where the bending length shall stay 50 mm. The size of the test piece is 38.0±0.2 mm in width as a standerd (which may be 30.0 to 40.0 mm) and 70 mm in length. The number of the test pieces were 10 or more in each of the machine direction and the transverse direction. The stiffness tester provides a set of rollers of 8.60±0.05 mm in diameter which can freely rotate and can obtain the loading length of 50.0±0.5 mm when the test piece comes to bend by 15 degrees.

The terms "machine direction and transverse direction" as used herein mean the machine direction (MD) and the transverse direction (TD) upon formation of the support. For example, a paper-making direction corresponds to the machine direction, and a direction making a right angle with the paper-making direction corresponds to the transverse direction.

In the present invention, a support having a stiffness in the machine direction of 4.0 to 5.0 g.cm and a stiffness in the transverse direction of 2.9 to 3.4 g.cm is preferred and a support having a stiffness of 4.2 to 4.7 g.cm in the machine direction and a stiffness of 3.0 to 3.4 g.cm in the transverse direction is particularly preferred.

If the stiffness of a support is greater than 5.0 g.cm in MD and greater than 3.4 g.cm in TD, an impact upon collision between the front end of a thermally developable light-sensitive element or a dye-immobilizing element and a heating roll becomes so large that it provides an opportunity for air to get into the space formed between the two elements, resulting in an uneven transfer.

On the other hand, if the stiffness of a support is smaller than 4.0 g cm in MD and greater than 2.9 g.cm in TD, the front end of a thermally developable light-sensitive element or a dye-immobilizing element is crushed between heating rolls, resulting in folding or bending of the elements.

The length in the transverse direction of the photographic element in the present invention is generally from 10 to 200 cm, preferably from 20 to 50 cm.

As the material for the support to be used in the present invention, those which can withstand the processing temperature are preferred. Such materials include, for example, paper and its analogues, an acetylcellulose film, a cellulose ester film, a polyvinylacetal film, a polystyrene film, a polycarbonate film, a polyethylene terephthalate film, and films or resins related thereto. Paper and its analogues such as synthetic papers are preferable and papers laminated by a polyorefine such as polyethylene are more preferable.

The thickness of the support to be used in the present invention is generally from 30 $\mu$m to 400 $\mu$m, preferably from 80 $\mu$m to 250 $\mu$m.

For the support made of synthetic resin, the stiffness may be adjusted by selecting a thickness and/or a degree of polymerization.

Particularly preferred supports are those having an improved smoothness of a surface which a dye receiving layer is provided on, and those described below are preferred. That is, those supports which have such surface properties that, as to a filtered waviness curve thereof determined based on a profile curve measured according to JIS B0610 under the condition of a cut-off value of 0.8 mm, ten or less measuring points, preferably 5 or less points, out of 100 arbitrarily selected measuring points having a maximum waviness of 4 $\mu$m or more measured with a standard length of 2.5 mm, more preferably, 10 or less measuring points out of 100 arbitrarily selected measuring points have a maximum waviness of 2 $\mu$m or more are favored.

The term "profile curve" as used herein means a curve appearing on the cut end of a sample surface formed by cutting the surface by a plane at right angles to the average surface of the sample surface. The term "filtered waviness curve" as used herein means a curve obtained by removing wave components with shorter wavelengths from the above-described filtered waviness curve using a low-pass filter. The term "cut-off value" as used herein means a wavelength corresponding to a frequency at which there results a gain of 70% when a low-pass filter with a damping ratio of $-12$ dB/oct is used for determining a filtered waviness curve. The term "maximum waviness of filtered wave" means the maximum wavelength ($W_{CM}$) within a predetermined length (standard length) (L) of the filtered waviness curve presented in $\mu$m units.

The reason for employment of the filtered waviness curve using a high-pass cut-off value for presenting surface unevenness of the support is that density unevenness is scarcely influenced by unevenness shorter than a certain wavelength.

The reason for employment of a standard length of 2.5 mm is that density unevenness is scarcely influenced by unevenness longer than a certain wavelength. This tendency becomes remarkable when the length of a support is not longer than 100 μm.

As is described above, the present invention is characterized in that, when 100 $W_{CM}$ values are measured at arbitrarily selected 100 points, only 10 or less $W_{CM}$ values are 4 μm or more.

The base paper for the support (paper or its analogues) to be used in the present invention is made by predominantly using wood pulp such as NBKP, LBKP, NBSP or LBSP, with synthetic fibers such as nylon or synthetic pulp such as polyethylene being optionally mixed. Freeness of the pulp is preferably 200 to 350 CSF in consideration of formation and paper-making adaptability.

Further, in addition to the above-described additives, fillers such as clay, talc, calcium carbonate and urea resin fine particles, sizing agents such as rosin, alkylketene dimer, a higher fatty acid salt, an epoxidized higher fatty acid amide, paraffin wax, and alkenylsuccinic acid anhydride, paper strength-increasing agents such as polyacrylamide, and fixing agents such as alumina sulfate and a cationic polymer may optionally be added.

It is preferred to surface-size the surface of the support with a film-forming polymer such as gelatin, starch, carboxymethylcellulose, polyacrylamide, polyvinyl alcohol or a modified polyvinyl alcohol, particularly preferably, polyvinyl alcohol or a modified polyvinyl alcohol. The term "surface-size" as used herein means to coat a surface of a paper with a film-formoing polymer (e.g., colloid substance, etc.) in order to prevent the paper from absorbing liquid or moisture. The modified polyvinyl alcohol includes a carboxyl-modified product, a silanol-modified product, a copolymer with acrylamide, and the like. If necessary, a surface sizing treatment may be conducted using an antistatic agent, a fluorescent brightening agent, a pigment, a defoaming agent, a cation-containing compound, etc. together with the film-forming polymer.

As a paper-making machine to be used in the present invention, an ordinary Fourdrinier paper machine may be used, with a calender being preferably provided before winding and before surface sizing.

The base paper to be used in the support of the present invention has a basis weight of preferably from 60 to 230 g/m$^2$, more preferably from 85 to 190 g/m$^2$ and a thickness of preferably from 55 μm to 230 μm, more preferably from 80 to 190 μm.

Polyolefin resins to be used for coating (or laminating) both sides of a base paper include, for example, homopolymers of α-olefin such as polyethylene and polypropylene and mixtures of various polymers thereof. Particularly preferred polyolefins are a high-density polyethylene, a low-density polyethylene, and a mixture thereof. These polyolefins are usually coated on both sides of a base paper by an extrusion coating process. Therefore, they are not limited as to molecular weight as long as they enable extrusion coating. Usually, however, polyolefins having a molecular weight of 10$^4$ to 10$^6$ are used.

As a polyolefin coating layer on the front surface, namely, on the surface on which a light-sensitive layer or a dye-immobilizing layer is to be coated, a white pigment-containing layer is preferred, with the kind and amount of the white pigment being properly selectable from among those which are known in the art. In addition, known additives such as a fluorescent brightening agent and an antioxidant may further be added.

A polyolefin coating layer on the back side may be constituted by the aforesaid polyolefin resin alone, with colored pigments, white pigments, etc. being optionally added thereto. Further, the additives referred to with respect to the polyolefin coating layer on the front surface may also be added to the back side layer.

For example, a low-density polyolefin may be provided on light-sensitive layer-side of the support of the thermally developable light-sensitive element and/or dye immobilizing layer-side of the dye-immobilizing element in a thickness of generally from 35 to 55 μm, preferably from 40 to 50 μm, and a high-density polyolefin may be provided on the surface opposed to the light-sensitive layer-side of the support of the thermally developable light-sensitive element and/or dye immobilizing layer-side of the support of the dye-immobilizing element in a thickness of generally from 24 to 41 μm, preferably from 30 to 39 μm.

Additionally, as the equipment for extrusion-coating the polyolefin, an ordinary polyolefin extruder and a laminating machine are used.

In order to provide a light-sensitive layer or a dye-immobilizing layer on the polyolefin coating layer, the light-sensitive layer or the dye-immobilizing layer is coated thereon, preferably after subjecting the surface of the polyolefin coating layer to a corona discharge treatment, a glow discharge treatment, a flame treatment or the like and providing, if necessary, a subbing layer or an antihalation layer.

As a support having 10 or less $W_{CM}$ values equal to or more than 2 μm, when 100 $W_{CM}$ values are determined at 100 arbitrarily selected points, as mentioned hereinbefore, there are illustrated so-called synthetic papers. As such synthetic papers, film-process synthetic papers are preferred. Among the film-process synthetic papers, those which are produced according to an inner paper-making method (or extrusion method) in which microvoids are formed by stretching and those which are produced according to a surface-coating method by forming a white pigment-containing porous surface layer on plastic film are particularly preferred. More specifically, there are illustrated SGC#60, #80 or #110 made by Ohji Yuka Goseishi K. K. and WE-110, WP-110, SP-80, SPB-80, SE-80, SEB-80, etc. made by Nissin Cotton Spinning Co., Ltd. (as to more detail, see "On synthetic Paper 'YUPO'", catalogue issued by Oji Yuka Synthetic Paper Company Limited. and "On Nissinbo Synthetic Paper 'Peach Coat'" issued by Nisshin Spinning Co., Ltd.).

Of the above-described supports, hydrophobic supports which are subjected to a treatment of imparting hydrophilicity are preferred. The treatment of imparting hydrophilicity leads to good stickiness betweeen the surface of the support with gelatin-type coating compositions for a thermally developable light-sensitive element and/or a dye-immobilizing element. As a method for the treatment of imparting hydrophilicity, gelatin-type subbing layer is provided on the surface of the paper laminated by polyethylene (hydrophilic support) in a thickness of 0.1 to 0.5 μm after subjecting the surface of the support to a corona discharge treatment at from 5 to 20 kw/m. The coating composition for the gelatin-type subbing layer comprises gelatin, surface active agents, thickeners, solvents, etc.

In the present invention, the ,stiffness, means the stiffness of a support which has been subjected to the treatment of imparting hydrophilicity.

A photographic element of the present invention comprising a support having a stiffness in the machine direction of 4.0 to 5.0 g.cm and a stiffness in the transverse direction of 2.9 to 3.4 g.cm is preferably a dye-immobilizing element for receiving a diffusible dye from a thermally developable light-sensitive material capable of giving an imagewise distribution of a mobile dye (a diffusible dye) by thermal development. The handling and irregularities in the thermal development step are effectively improved by adjusting a stiffness of a support of a dye immobilizing element.

The image-forming process in accordance with the present invention is now illustrated below.

In the present invention, a thermal development step and a dye-transferring step may be independent from each other or may be conducted at the same time, or may be conducted in a continuous manner to the effect that the transferring step is conducted subsequent to the development step in a series of steps.

For example, the following are illustrated: (1) a process of imagewise exposing and heating a light-sensitive element, then superposing a dye-immobilizing element, if necessary, under heating to thereby transfer a mobile dye to the dye-immobilizing element and (2) a process of imagewise exposing a light-sensitive element, and heating it with a dye-immobilizing element being superposed thereon. The two processes (1) and (2) may be effected in the substantial absence of water or in the presence of a slight amount of water.

The heating temperature to be employed in the thermal development step may be about 50° C. to about 250° C., with about 80° C. to about 180° C. being particularly useful. The conveying speed in the thermal development step is generally from 1 to 50 mm/second, preferably from 5 to 30 mm/second, more preferably from 8 to 20 mm/second. In the case of heating in the presence of a slight amount of water, the upper limit of the heating temperature is the boiling point of water. In the case of conducting the transferring step after completion of the thermal development step, the heating temperature to be used in the transferring step may be between the temperature used in the preceding thermal development step and room temperature, with a temperature of not lower than 50° C., and lower than the temperature used in the thermal development step by about 10° C. being more preferable.

According to a preferred embodiment of the image-forming process of the present invention, heating is conducted in the presence of a slight amount of water and a base and/or a base precursor after or simultaneously with imagewise exposure, and a diffusible dye produced simultaneously with the development in conformity with, or in inverse conformity with, the development of the silver image is transferred to a dye-immobilizing layer. In this process, the diffusible dye-producing or releasing reaction and migration of the diffusible dye to the dye-immobilizing layer proceeds so fast that a color image with a high density can be obtained in a shorter time.

The amount of water to be used in this embodiment may be as small as that which is at least 0.1 time the weight of the total coated films of the light-sensitive element and the dye-immobilizing element and preferably from 0.1 time the weight of the total coated films of the light-sensitive element and the dye-immobilizing element to not more than the weight of a solvent of the volume corresponding to the maximum swelling volume of the total coated films (particularly preferably not more than that which is calculated by subtracting the weight of the total coated films from the weight of a solvent of the volume corresponding to the maximum swelling volume of the total coated films).

The coating films are unstable in a swelled state and, under some conditions, can locally cause blurring. In order to avoid such blurring, the amount of water is preferably not more than the amount of water corresponding to the volume of the total coating films of the light-sensitive element and the image-immobilizing element upon maximum swelling. Specifically, the amount of water present is preferably 1 g to 50 g, particularly preferably 2 g to 35 g, most preferably 3 g to 25 g, per $m^2$ of the sum of the area of the light-sensitive element and that of the dye-immobilizing element.

A base and/or a base precursor to be used in this embodiment may be incorporated in either or both of the light-sensitive element and the dye-immobilizing element. Alternatively, they may be supplied as a solution in water.

In the above-described embodiment, it is preferred to incorporate as a base precursor a slightly water-soluble basic metal compound and a compound capable of undergoing a chelate-forming reaction with a metal constituting the slightly water-soluble metal compound through a medium of water for the purpose of increasing pH of the image-forming reaction system upon heating. The term "image-forming reaction system" as used herein means a zone where the image-forming reaction takes place. Specifically, these are layers belonging to either the light-sensitive element or the dye-immobilizing element. If two or more layers exist, they may be incorporated in either of them.

In order to prevent the slightly soluble metal compound and the complex-forming compound from reacting with each other before development processing, they must be added to at least different layers. For example, with a so-called mono-sheet material wherein a light-sensitive element and a dye-immobilizing element are provided on the same support, the two compounds are added to different layers, with one or more layers being preferably sandwiched therebetween. In a more preferable embodiment, the slightly soluble metal compound and the complex-forming compound are separately incorporated in layers provided on different layers. For example, it is preferred to incorporate the slightly soluble metal compound in a light-sensitive layer and the complex-forming compound in a dye-immobilizing element. The complex-forming compound may be supplied by dissolving it in water which is allowed to be present. The slightly soluble metal compound is desirably incorporated as a dispersion of fine particles thereof prepared by those processes which are described in, for example, JP-A-56-174830 and JP-A-53-102733. The average particle size of the fine particles is preferably up to 50 microns, particularly preferably up to 5 microns. The slightly soluble metal compound may be added to any of a light-sensitive layer, an interlayer, a protective layer, etc. of the light-sensitive element, and may be added in portions to two or more layers.

Amounts of the slightly soluble metal compound and the complex-forming compound to be incorporated in the layers provided on a support vary depending upon the kind of compound used particle size of the slightly soluble metal compound, complex-forming reaction rate, etc. but, suitably, they are used in amounts of up to 50 wt % based on the weight of each coating film, more preferably 0.01 wt % to 40 wt %. In the case of supplying the complex-forming compound by dissolving in water, the concentration is preferably 0.005 mol to 5 mol, particularly preferably 0.05 mol to 2 mols, per liter. Further, in the present invention, the content of the complex-forming compound in the reaction system is preferably 1/100 time to 100 times, particularly preferably 1/10 time to 20 times the content of the slightly soluble metal compound.

As a technique for imparting water to a light-sensitive layer or a dye-immobilizing layer, there are illustrated, for example, those techniques which are described in JP-A-61-147244, p. 101, line 9 to p. 102, line 4.

As a heating means to be employed in the development and/or transferring step, there are illustrated those means which are described in JP-A-61-147244, p. 102, line 14 to p. 103, line 11 such as a hot plate, an iron, a heated roller, etc. Alternatively, it may be possible to provide a layer of a conductive material such as graphite, carbon black or metal on the light-sensitive element and/or the dye-immobilizing element and energize the conductive layer for directly heating the element.

Pressing condition and pressing manner to be employed for superposing the light-sensitive element and the dye-immobilizing element on each other in close contact may be those which are described in JP-A-61-147244, pp. 103–104.

Various thermally developing apparatuses may be used for the treatment of the photographic element of the present invention. For example, those apparatuses which are described in JP-A-59-75247, JP-A-59-177547, JP-A-59-181353, JP-A-60-18951 and JP-A-U-62-25942 are preferably used. The term "JP-A-U" as used herein means an unexamined published Japanese utility model application.

Typical combinations of steps for treating the so-called two-sheet type photographic materials wherein a light-sensitive element and a dye-immobilizing element are formed on different supports are illustrated below:

(i) Exposing step--thermal development step--step of superposing light-sensitive element and dye-immobilizing element on each other--transferring step--delaminating step;

(ii) Exposing step--step of superposing light-sensitive element and dye-immobilizing element on each other--step of thermal development and transfer---delaminating step;

(iii) Exposing step--thermal development step---solvent-supplying step--step of superposing light-sensitive element and dye-immobilizing element on each other--transferring step--delaminating step; and (iv) Exposing step--solvent-supplying step--step of superposing light-sensitive element and dye-immobilizing element on each other--step of thermal development and transfer--delaminating step.

The delaminating step may be omitted. Classification of the above-described steps are employed for convenience and, in the case of conducting a plurality of steps in a continuous manner, thermal development, for example, may be conducted subsequent to exposure. Thus, cases wherein a plurality of steps are not clearly discriminated from each other are also included. A proper combination of the steps may be selected in consideration of how to generate a base--for example, by incorporating a base precursor or by reacting compounds incorporated in the two photographic elements with each other in the presence of a solvent or in consideration of the use of a promoter for adjusting the developing rate and the transfer rate.

With positive-working photographic materials which require fogging by light, a step of overall exposure may be provided before or during the thermal development step and at least before completion of the development.

Where the light-sensitive element and the dye-immobilizing element are formed on the same support, the superposing step among the aforementioned steps is not necessary, and the delaminating step may be omitted. Details on these various image-forming processes are described in the patent publications cited with respect to the prior art.

One embodiment of an apparatus for forming an image according to the thermal development process to be employed for the image-forming process as described above is described below with reference to FIG. 1.

The apparatus shown in FIG. 1 for forming an image according to the thermal development process has at least a light-sensitive element-feeding section 4, a dye-immobilizing element-feeding section (paper-feeding section) 1, a section 40 for superposing the light-sensitive element and the dye-immobilizing element on each other, a thermally developing and transferring section 7, and a delaminating section 9.

As is shown in FIG. 1, light-sensitive element 3 is held in light-sensitive element-feeding section 4, and is fed as the occasion demands. Light-sensitive element 3 may be in a rolled form or a cut-sheet form. With a rolled element, it is cut into a necessary length by means of a cutter 5. Then, element 3 is fed to an exposure section 6, would around an exposure drum 61, and conveyed to an N exposure source 62 by rotation.

Light-sensitive element 3 exposed in the exposure section 62 is rotated in a direction reverse to the rotation upon being wound around the exposure drum 61, and fed to thermally developing and transferring section 7. Then, if necessary, light-sensitive element 3 is coated with a slight amount of a solvent in an image-forming, solvent-applying section 8 provided between exposure section 6 and thermally developing and transferring section 7.

The dye-immobilizing elements 2 are held in a superposed state in a tray 11. When a sensor (not shown) detects light-sensitive element 3 in a predetermined position, a pick-up roller 12 in the dye-immobilizing element-feeding section 1 starts rotating to feed the dye-immobilizing element 2 to thermally developing and transferring section 7 through conveying rollers 13 to 16 (and, if necessary, guide plates 17 to 19).

The thus fed dye-immobilizing element 2 is superposed on light-sensitive element 3 conveyed as mentioned hereinbefore in superposing section 40 by means of rollers 21 and 22, and the assembly is conveyed and heated by means of heated rollers 23 to 28 through thermally developing and transferring section 7 to thereby conduct development and image transfer. Then, the assembly is conveyed to delaminating section 9 where light-sensitive element 3 is delaminated from dye-immobilizing element 2.

The image-formed dye-immobilizing element 2 is then conveyed to a drying section 10, and the dried element is discharged to a discharge section 31 and accumulated there. The light-sensitive element 3 is conveyed through a light-sensitive element-conveying section 20 and discharged into a waste box 30 for light-sensitive elements.

The thermally developable light-sensitive element in accordance with the present invention fundamentally comprises a support having provided thereon a light-sensitive silver halide, a binder, and a dye-providing compound (in some cases, a reducing agent also functions as the dye-providing compound as will be described hereinafter) and, if necessary, an organometallic compound, etc. These components are in many cases incorporated in one and the same layer. However, they may be separately incorporated in different layers if they are in a state of being reacted with each other. For example, incorporation of a colored, dye-providing compound in a layer under a silver halide emulsion serves to prevent a decrease in sensitivity. The reducing agent is preferably incorporated in the thermally developable light-sensitive element, but may be fed from the outside by, for example, diffusing from a dye-immobilizing element as will be described hereinafter.

In order to obtain a wide range of colors within the chromaticity using the three primary colors of yellow, magenta and cyan, at least three silver halide emulsion layers having a light sensitivity in different spectral regions from each other are used in combination. For example, there are illustrated a combination of a blue-sensitive layer, a green-sensitive layer and a red-sensitive layer and a combination of a green-sensitive layer, a red-sensitive layer and an infrared light-sensitive layer. As to the order of the light-sensitive layers, various orders known with ordinary color light-sensitive materials may be employed. Each of the light-sensitive layers may be divided into two or more layers as the case demands.

In the thermally developable light-sensitive element, various auxiliary layers such as a protective layer, a subbing layer, an interlayer, a yellow filter layer, an antihalation layer, a backing layer, etc. may be provided.

Silver halides to be used in the present invention include silver chloride, silver bromide, silver bromoiodide, silver chlorobromide, silver chloroiodide and silver chlorobromoiodide.

The silver halide emulsion to be used in the present invention may be a surface latent image-forming emulsion or an inner latent image-forming emulsion. The inner latent image-forming emulsion is used as a direct reversal emulsion by combining with a nucleating agent or a photo-fogging technique. In addition, the emulsion may be a so-called core/shell emulsion containing grains having an inner portion and a surface layer different from each other in a phase composition. The silver halide emulsion may be mono-dispersed or poly-dispersed or may be a mixture of mono-disperse emulsions. Grain sizes of the silver halide grains are preferably 0.1 to 2 $\mu$m, particularly preferably 0.2 to 1.5 $\mu$m. As to the crystal habit of the silver halide grains, any of cubes, octahedrons, tetradecahedrons, tabular grains with a high aspect ratio, etc. may be used.

Specifically, any of the silver halide emulsions described in U.S. Pat. No. 4,500,626, col. 50, U.S. Pat. No. 4,628,021, Research Disclosure (hereinafter abbreviated as "RD"), 17029 (1978), JP-A-62-253159, etc. may be used.

The silver halide may be used as a primitive emulsion, but is usually chemically sensitized before use. Chemical sensitization can be conducted by employing any of the sensitization process which are known for emulsions of ordinary light-sensitive materials, a sulfur sensitization process, a reduction sensitization process, a noble metal sensitization process, etc., alone or in combination. These chemically sensitizing processes may be conducted in the presence of a nitrogen-containing heterocyclic compound (JP-A-62-253159).

In the present invention, the light-sensitive silver halide is coated in an amount of 1 mg to 10 g/m$^2$ as silver.

The silver halide to be used in the present invention may be spectrally sensitized with methine dyes or the like. Dyes to be used include cyanine dyes, merocyanine dyes, complex cyanine dyes, complex merocyanine dyes, holopolar cyanine dyes, hemicyanine dyes, styryl dyes, and hemioxonol dyes.

Specifically, those sensitizing dyes which are described in U.S. Pat. No. 4,167,257, JP-A-59-180550, JP-A-60-140335, RD 17029 (1978), pp. 12–13, etc. may be used.

These sensitizing dyes may be used alone or as a combination. A combination of sensitizing dyes is often employed for the purpose of super-sensitization.

A dye which itself does not have a spectrally sensitizing effect or a substance which substantially does not absorb visible light and which shows a super-sensitizing effect may be incorporated in the emulsion together with the sensitizing dye. (For example, those which are described in U.S. Pat. No. 3,615,641 and JP-A-63-23145.)

These sensitizing dyes are added to an emulsion during chemical ripening or before or after chemical ripening or, as is described in U.S. Pat. No. 4,183,756 and U.S. Pat. No. 4,225,666, in the step of formation of nuclei of silver halide grains. They are added in amounts of generally about $10^{-8}$ to about $10^{-2}$ mol per mol of silver.

In the present invention, organometallic salts may be used as oxidants together with the light-sensitive silver halide. Of such organometallic salts, organic silver salts are particularly preferred.

As organic compounds usable for forming the oxidants of the above described organic silver salts, there are illustrated benzotriazoles described in U.S. Pat. No. 4,500,626, cols. 52–53, fatty acids, etc. In addition, silver salts of carboxylic acids having an alkynyl group such as silver phenylpropiolate described in JP-A-60-113235 and silver acetylide described in JP-A-61-149044 are also useful. The organic silver salts may be used as a combination of two or more.

The above-described organic silver salts may be used in amounts of 0.01 to 10 mols, preferably 0.01 to 1 mol, per mol of light-sensitive silver halide. The sum of the amount of coated light-sensitive silver halide and the amount of coated organic silver salt is suitably 50 mg to 10 g/m$^2$ as silver.

In the present invention, various antifogging agents or photographic stabilizers may be used. For example, azoles or azaindenes described in RD 17643 (1978), pp. 24–25, carboxylic acids and phosphoric acids containing nitrogen and described in JP-A-59-168442, mercapto compounds and metal salts thereof described in JP-A-59-111636, and acetylene compounds described in JP-A-62-87957 may be used.

As the reducing agents to be used in the present invention, those which are known in the field of thermally developable light-sensitive materials may be used. In addition, dye-providing compounds having a reducing ability to be described hereinafter are also included. (In this case, other reducing agents may be used in combination.) Further, a reducing agent precursor which itself does not have any reducing ability but acquires a reducing ability by the action of a nucleophilic reagent or heat during development may also be used.

As examples of the reducing agents to be used in the present invention, those reducing agents and reducing agent precursors which are described in U.S. Pat. No. 4,500,626, cols. 49–50, U.S. Pat. No. 4,483,914, cols. 30–31, U.S. Pat. No. 4,330,617, U.S. Pat. No. 4,590,152, JP-A-60-140335, pp. 17–18, JP-A-57-40245, JP-A-56-138736, JP-A-59-178458, JP-A-59-53831, JP-A-59-182449, JP-A-59-182450, JP-A-60-119555, JP-A-60-128436 through 60-128439, JP-A-60-198540, JP-A-60-181742, JP-A-61-259253, JP-A-62-244044, JP-A-62-131253 through 62-131256, European Patent No. 220,746A2, pp. 78–96, etc. may be used.

Combinations of various reducing agents as disclosed in U.S. Pat. No. 3,039,869 may also be employed.

In the case of using a diffusion-resistant reducing agent, an electron-transporting agent and/or an electron-transporting agent precursor may be used, if necessary, for promoting the migration of electrons between the diffusion-resistant reducing agent and a developable silver halide.

The electron-transporting agent or the electron-transporting agent precursor may be selected from among the aforementioned reducing agents or precursors thereof. The electron-transporting agent or the electron-transporting agent precursor desirably has a larger mobility than the diffusion-resistant reducing agent (electron donor). Particularly useful electron-transporting agents are 1-phenyl-3-pyrazolidones or aminophenols.

The diffusion-resistant reducing agent (electron donor) to be used in combination with the electron-transporting agent may be selected from among the aforementioned reducing agents substantially not migrating in the layer of a light-sensitive element. Preferable examples thereof include hydroquinones, sulfonamidophenols, sulfonamidonaphthols, those compounds which are described in JP-A-53-110827 as electron donors, and diffusion-resistant dye-providing compounds having a reducing ability and being described hereinafter.

In the present invention, the reducing agent is added in an amount of 0.01 to 20 mols, particularly preferably 0.1 to 10 mols, per mol of silver.

Examples of the dye-providing compounds to be used in the present invention include compounds (couplers) capable of forming a dye by an oxidative coupling reaction. Such couplers are preferably 2-equivalent couplers which have a diffusion-resistant group in a coupling-off group and can form a diffusible dye by the oxidative coupling reaction. The diffusion-resistant group may form a polymer chain. Specific examples of the color developing agents and couplers are described in detail in T. H. James; "The Theory of the Photographic Process", pp. 291–334 and pp. 354–361, JP-A-58-123533, JP-A-58-1749046, JP-A-58-149047, JP-A-59-111148, JP-A-59-124399, JP-A-174835, JP-A-59-231539, JP-A-59-231540, JP-A-60-2950, JP-A-60-2951, JP-A-60-14242, JP-A-60-23474, JP-A-60-66249, etc.

As another type of dye-providing compounds, there are those compounds which have the function of imagewise releasing or diffusing a diffusible dye. This type of compound can be represented by the following general formula (LI):

$$(Dye-Y)_n-Z \qquad (LI)$$

wherein Dye represents a dye moiety, a temporarily short-shifted dye moiety or a dye precursor moiety, Y represents a mere bond or a linking group, Z represents a group which produces a difference in diffusibility of the compound represented by $(Dye-Y)_n-Z$ in a direct or inverse conformity with the development of a light-sensitive silver salt having an imagewise latent image, or which releases Dye to produce a difference in diffusibility between the released Dye and $(Dye-Y)_n-Z$, and n represents 1 or 2, provided that when n represents 2, two Dye-Y groups may be the same or different.

As specific examples of the dye-providing compounds represented by the general formula (LI), there are illustrated the following compounds (1) to (5). Of the following compounds, compounds (1) to (3) form a diffusible dye image (positive dye image) in an inverse conformity with the development of a silver halide and compounds (4) and (5) form a diffusible dye image (negative dye image) in a direct conformity with the development of a silver halide.

(1) Dye developers wherein a hydroquinone developing agent is linked to a dye component, as described in U.S. Pat. No. 3,134,764, U.S. Pat. No. 3,362,819, U.S. Pat. No. 3,597,200, U.S. Pat. No. 3,544,545, U.S. Pat. No. 3,482,972, etc. This type of dye developer is diffusible in an alkaline environment but, when reacted with silver halide, becomes non-diffusible.

(2) As is described in U.S. Pat. No. 4,503,137, etc., those non-diffusible compounds which release a diffusible dye in an alkaline environment but, when reacted with silver halide, lose the dye-releasing ability may be used. As examples thereof, there are illustrated those compounds which are described in U.S. Pat. No. 3,980,479, etc. and which release a diffusible dye by an intramolecular nucleophilic substitution reaction, and those compounds which are described in U.S. Pat. No. 4,199,354, etc. and which release a diffusible dye by an intramolecular re-cyclizing reaction of an isoxazolone ring.

(3) As is described in U.S. Pat. No. 4,559,290, EP No. 220,746A2, Kokai Gihou 87-6199, etc. Those non-diffusible compounds which react with a remaining reducing agent not oxidized by the development to release a diffusible dye may also be used.

Examples thereof include those compounds which are described in U.S. Pat. No. 4,139,389, U.S. Pat. No. 4,139,379, JP-A-59-185333, JP-A-57-84453, etc. and which releases a diffusible dye by an intramolecular nucleophilic substitution reaction after being reduced, those compounds which are described in U.S. Pat. No. 4,232,107, JP-A-59-101649, JP-A-61-88257, RD-24025 (1984), etc. and which release, after being reduced, a diffusible dye by an intramolecular electron migration reaction, those compounds which are described in West German Patent No. 3,008,588A, JP-A-56-142530, U.S. Pat. No. 4,343,893, U.S. Pat. No. 4,619,884, etc. and which release, after being reduced, a diffusible dye by cleavage of the single bond, those nitro compounds which are described in U.S. Pat. No. 4,450,223, etc. and which release a diffusible dye after receiving electrons, and those compounds which are described in U.S. Pat. No. 4,609,610, etc. and which release a diffusible dye after receiving electrons.

More preferable compounds are those compounds which are described in EP No. 220,746A2, Koukai Gihou 87-6199, JP-A-63-201653, JP-A-63-201654, etc.

and which contain a N—X bond (wherein X represents an oxygen atom, a sulfur atom or a nitrogen atom) and an electron-attractive group within the molecule, those compounds which are described in JP-A-1-26842 and which contain a $SO_2$—X bond (wherein X is the same as defined above) and an electron-attractive group, those compounds which are described in JP-A-63-271341 and which contain a C—X' bond (wherein X' is the same as defined for X or —$SO_2$—) and an electron-attractive group.

Of these, those compounds which contain an N—X bond and an electron-attractive group within the molecule are particularly preferred. Specific examples thereof are compounds (1) to (3), (7) to (10), (12), (13), (15), (23) to (26), (31), (32), (35), (36), (40), (41), (44), (53) to (59), (64), and (70) described in EP No. 220,746A2, compounds (11) through (23) described in Koukai Gihou 87-6199, and the like.

(4) Compounds (DDR couplers) having a diffusible dye in the coupling-off group and being capable of releasing a diffusible dye by the reaction with an oxidation product of a reducing agent. Specifically, there are illustrated those which are described in British Patent No. 1,330,524, JP-B-48-39165 (the term "JP-B" as used herein means an "examined Japanese patent publication"), U.S. Pat. No. 3,443,940, U.S. Pat. No. 4,474,867, U.S. Pat. No. 4,483,914, etc.

(5) Compounds (DRR compounds) capable of reducing a silver halide or an organic silver salt and, after reacting with the other, releasing a diffusible dye. Since this type of compound eliminates the necessity for the use of other reducing agents, they do not cause the problem of image stain which is caused by an oxidative decomposition product of reducing agents, and thus are preferred. Typical examples thereof are described in U.S. Pat. Nos. 3,928,312, 4,053,312, 4,055,428 and 4,336,322, JP-A-59-65839, JP-A-59-69839, JP-A-53- 3819, JP-A-51-104343, RD 17465, U.S. Pat. Nos. 3,725,062, 3,728,113 and 3,443,939, JP-A-58-116537, JP-A-57-179840, U.S. Pat. No. 4,500,626, etc. Specific examples of the DRR compounds are those compounds which are described in the foregoing U.S. Pat. No. 4,500,626, cols. 22–44, with compounds (1) to (3), (10) to (13), (16) to (19), (28) to (30), (33) to (35), (38) to (40), and (42) to (64) described in this U.S. Patent being particularly preferred. Those compounds which are described in U.S. Pat. No. 4,639,408, cols. 37–39 are also useful.

In addition, as other dye-providing compounds than the above-described couplers and the compounds of the general formula (LI), dye-silver compounds may be used wherein an organic silver salt is linked to a dye (Research Disclosure, May 1978, pp. 54–58, etc.), azo dyes may be used with a thermally developable silver-dye bleach process (U.S. Pat. No. 4,235,957, RD April 1976, pp. 30–32, etc.), leuco dyes (U.S. Pat. Nos. 3,985,565, 4,022,617, etc.) and the like.

Hydrophobic additives such as the dye-providing compounds and the diffusion-resistant reducing agents may be introduced into layers of a light-sensitive element according to known processes as described in U.S. Pat. No. 2,322,027. In this case, those high-boiling organic solvents which are described in JP-A-59-83154, JP-A-59-178451, JP-A-59-178452, JP-A-59-178453, JP-A-59-178454, JP-A-59-178455, JP-A-59-178457, etc. may be used in combination with, if necessary, low-boiling organic solvents having a boiling point of 50° C. to 160° C.

The high-boiling organic solvent is used in an amount of generally up to 10 g, preferably up to 5 g, per g of the dye-providing compound used, and generally up to 1 cc, more preferably up to 0.5 cc, most preferably up to 0.3 cc, per g of the binder. The dispersing process using a polymer and described in JP-B-51-39853 and JP-A-51-59943 may also be employed.

With compounds which are substantially water-insoluble, technique of dispersing them as fine particles in a binder may also be employed as well as the above-described techniques.

Various surfactants may be used for dispersing a hydrophobic compound in a hydrophilic colloid. For example, those which are disclosed as surfactants in JP-A-59-157636, pp. 37–38 may be used.

In the present invention, those compounds which can activate development and at the same time stabilize an image may be used in the light-sensitive element. Specific compounds to be preferably used are described in U.S. Pat. No. 4,500,626, cols. 51–52.

The dye-immobilizing element to be preferably used in the present invention has at least one layer containing a mordant and a binder. As the mordant, those which are known in the photogrpahic field may be used. Specific examples thereof are described in U.S. Pat. No. 4,500,626, cols. 58–59, JP-A-61-88256, pp. 32–41, JP-A-62-244043, JP-A-62-244036, etc. In addition, dye-receiving high molecular weight compounds as described in U.S. Pat. No. 4,463,079 may also be used.

The dye-immobilizing layer may, if necessary, have auxiliary layers such as a protective layer, a stripping layer, an anti-curling layer, etc. It is particularly useful to provide a protective layer.

As a binder for layers constituting the light-sensitive element or the dye-immobilizing element, hydrophilic ones are preferably used. Examples thereof are those which are described in JP-A-62-253159, pp. 26–28. Specifically, transparent or semi-transparent hydrophilic binders are preferred. For example, natural compounds such as proteins (e.g., gelatin and gelatin derivatives) and polysaccharides (e.g., cellulose derivatives, starch, gum arabic, dextran and pullulan) and synthetic high polymer compounds such as polyvinyl alcohol, polyvinyl pyroolidone, acrylamide polymer, etc. may be used. In addition, highly water-absorbing polymers described in, for example, JP-A-62-245260, that is, homopolymers of a vinyl monomer having —COOM or —$SO_3$M (wherein M represents a hydrogen atom or an alkali metal) or copolymers of these vinyl monomers with each other, or copolymers of the vinyl monomer and an other vinyl monomer (e.g., sodium methacrylate, ammonium methacrylate or Sumika Gel L-5H made by Sumitomo Chemical Co., Ltd.) may be used as well. These binders may be used as a combination of two or more.

In the case of employing a system in which thermal development is conducted by feeding a slight amount of water, absorption of water can be rapidly effected by using the above-described highly water-absorbing polymer. When used in the dye-immobilizing layer or its protective layer, the highly water-absorbing polymer can prevent transferred dyes from retransferring from the dye-immobilizing element to others.

In the present invention, the binder is coated in an amount of preferably up to 20 g, more preferably up to 10 g, most preferably up to 7 g, per $m^2$.

As a hardening agent to be used for layers constituting the light-sensitive element or the dye-immobilizing element, those which are described in U.S. Pat. No. 4,678,739, COL. 41, JP-A-59-116655, JP-A-62-245261, JP-A-61-18942, etc. may be used. More specifically, aldehyde hardeners (e.g., formaldehyde), aziridine hardeners, epoxy hardeners (e.g.,

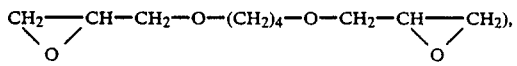

vinyl sulfone hardeners (e.g., N,N'-ethylenebis(vinylsulfonyl-acetamido)ethane), N-methylol hardeners (e.g., dimethylolureas), and high molecular hardeners (those compounds which are described in JP-A-62-234157, etc.) may be used.

An image formation-promoting agent may be used in the light-sensitive element and/or the dye-immobilizing element. The image formation-promoting agent has a function of promoting the oxidation-reduction reaction between a silver salt oxidant and a reducing agent, a function of promoting the generation of a dye from a dye-providing substance or decomposition of a dye or a reaction of, for example, releasing a diffusible dye, or a function of promoting migration of a dye from the light-sensitive material layer to the dye-immobilizing layer. From a physicochemical standpoint, the image formation-promoting agents are classified into bases or base precursors, nucleophilic compounds, high-boiling organic solvents (oils), thermal solvents, surfactants, compounds mutually acting with silver or a silver ion, and the like. However, these substances generally perform a plurality of the above-described functions and exert a plurality of the above-described promoting effects. These are described in detail in U.S. Pat. No. 4,678,739, cols. 38–40.

As the base precursors, salts of an organic acid and a base and which undergo decarboxylation upon being heated may be used, in particular, those compounds which release an amine by an intramolecular nucleophilic substitution reaction, a Lossen rearrangement or a Beckmann rearrangement. Specific examples thereof are described in U.S. Pat. No. 4,511,493, JP-A-62-65038, etc.

In the system of conducting thermal development and dye transfer at the same time in the presence of a small amount of water, the base and/or base precursor is preferably incorporated in the dye-immobilizing element for enhancing preservability of the light-sensitive element.

In addition, a combination of a slightly soluble metal compound and a compound capable of forming a chelate with a metal ion constituting this slightly soluble metal compound (hereinafter referred to as a chelate-forming compound) described in European Patent Laid-Open No. 210,660, compounds described in JP-A-61-232451 and capable of generating a base by electorlysis, and the like may also be used as base precursors, with the former being particularly effective. The slightly soluble metal compound and the chelate-forming compound are advantageously added separately to the light-sensitive element and the dye-immobilizing element.

Various development-stopping agents may be used i the light-sensitive element and/or the dye-immobilizing element of the present invention for the purpose of constantly obtaining a definite image regardless of a change in processing temperature and processing time during development.

The term "development-stopping agent" as used herein means a compound which, after proper development, rapidly neutralizes the base or reacts with the base to decrease the base concentration in the film and stop development or a compound which mutually acts with silver and a silver salt to inhibit development. Specifically, these include acid precursors capable of releasing an acid upon being heated, electrophilic compounds undergoing a substitution reaction with a co-present base upon being heated, nitrogen-containing heterocyclic compounds, mercapto compounds, and precursors thereof. More detailed descriptions thereon are given in JP-A-62-253159, pp. 31–32.

In the layers constituting the light-sensitive element or the dye-immobilizing element (including backing layers), various polymer latexes may be incorporated for the purpose of improving physical properties of the coated films—for example, for obtaining dimensional stability, preventing curling, preventing adhesion and cracking of film, and preventing pressure sensitization or desensitization. Specifically, any of polymer latexes described in JP-A-62-245258, JP-A-62-136648, JP-A-62-110066, etc. may be used. In particular, when used in a mordanting layer, a polymer latex having a low (up to 40° C.) glass transition point serves to prevent cracking of the mordant layer and, when used in a backing layer, a polymer latex having a higher glass transition point exhibits an anti-curling effect.

In the layers constituting the light-sensitive element or the dye-immobilizing element (including backing layers), plasticizers, slipping agents, or high-boiling organic solvents (as agents for improving stripping properties between the light-sensitive element and the dye-immobilizing element) may be used. Specific examples thereof are those which are described in JP-A-62-253159, p. 25 and JP-A-62-245253.

Further for the above-described purposes, various silicone oils (all silicone oils, including dimethylsilicone oil and modified silicone oils prepared by introducing various organic groups into dimethylsiloxane) may be used. As the silicone oils, various modified silicone oils described in "Modified Silicone Oils", technical document P6-18B (issued by Shinetsu Silicone Co., Ltd.), particularly carboxy-modified silicone (trade name: X-22-3710), etc. are effective.

In addition, those silicone oils which are described in JP-A-62-215953 and JP-A-62-23687 are also effective.

An anti-fading agent may be used in the light-sensitive element of the dye immobilizing element. As the anti-fading agent, for example, antioxidants, ultraviolet ray absorbents and a certain kind of metal complexes may be used. As the antioxidant, for example, chroman compounds, coumaran compounds, phenolic compounds (e.g., hindered phenols), hydroquinone derivatives, hindered amine derivatives, and spiroindane compounds may be used. Those compounds which are described in JP-A-61-159644 are also effective.

As the ultraviolet ray absorbent, benzotriazole compounds (U.S. Pat. No. 3,533,794, etc.), 4-thiazolidone compounds (e.g., U.S. Pat. No. 3,352,681), benzophenone compounds (e.g., JP-A-46-2784), and those described in JP-A-54-48535, JP-A-62-136641, JP-A-61-88256, etc. may be used. In addition, ultraviolet ray-absorbing polymers described in JP-A-62-260152 are also effective.

As the metal complex, those compounds described in U.S. Pat. No. 4,241,155, U.S. Pat. No. 4,245,018, cols. 3-36, U.S. Pat. No. 4,254,195, cols. 3-8, JP-A-50-87649, JP-A-62-174741, JP-A-61-88256, pp. 27-29, JP-A-1-75568, JP-A-63-199248, etc. may be used.

Examples of useful anti-fading agents are described in JP-A-62-215272, pp. 125-137.

The anti-fading agent for preventing the fading of the dye transferred to the dye-immobilizing element may be previously incorporated in the dye-immobilizing element or fed thereto from outside by, for example, the light-sensitive element.

The above-described antioxidants, ultraviolet ray absorbents and the metal complexes may be used as a combination thereof.

A fluorescent brightening agent may be used in the light-sensitive element or the dye-immobilizing element. In particular, the fluorescent brightening agent is preferably incorporated in the dye-immobilizing element or fed from outside by, for example, the light-sensitive element. Examples thereof include those compounds which are described in K. Veenkataraman; "The Chemistry of Synthetic Dyes", volume V, Chapter 8, JP-A-61-143752, etc. More specifically, stilbene compounds, coumarin compounds, biphenyl compounds, benzoxazolyl compounds, naphthalimide compounds, pyrazoline compounds, carbostyryl compounds, etc. may be used.

The fluorescent brightening agent may be used in combination with the anti-fading agent.

Various surfactants may be used in the layers constituting the light-sensitive element or the dye-immobilizing element as coating aids or for the purpose of improving stripping properties, slipping properties, antistatic properties and for promoting development. Specific examples of the surfactants are described in JP-A-62-173463, JP-A-62-183457, etc.

Organic fluorine-containing compounds may be incorporated in the layers constituting the light-sensitive element or the dye-immobilizing element for the purpose of improving slipping properties, antistatic properties, stripping properties, etc. Typical examples of the organic fluorine-containing compounds include fluorine-containing surfactants described in JP-B-57-9053, cols. 8 to 17, JP-A-61-20944, JP-A-62-135826, etc., and hydrophobic fluorine-containing compounds such as oily fluorine-containing compounds (e.g., fluorine-containing oil) and solid fluorine-containing compound resins (e.g., tetrafluoroethylene resin). A matting agent may be used in the layers constituting the light-sensitive element or the dye-immobilizing element. As the matting agent, those compounds which are described in JP-A-61-88256, p. 29 such as silicon dioxide, polyolefin or polymethacrylate, and those compounds which are described in Japanese patent application Nos. 62-110064 and 62-110065 such as benzoguanamine resin beads, polycarbonate resin beads, and AS resin (acrylonitrile-styrene copolymer) beads.

In addition, a thermal solvent, a defoaming agent, an antibacterial and antifungal agent, and a colloidal silica, etc. may be incorporated in the layers constituting the light-sensitive element or the dye-immobilizing element. Specific examples of these additives are described in JP-A-61-88256, pp. 26-32.

As a method of imagewise exposing the light-sensitive element to record, there are illustrated, for example, a method of directly photographing a scene or a human figure using a still camera, a method of exposing through a reversal film or a negative film using a printer or an enlarger, a method of scan-exposing according to an original through a slit or the like using an exposing apparatus for a copier, a method of exposing by emitting light using light-emitting diodes or various lasers through electric signals according to image information, and a method of outputting image information on an image display such as a CRT, a liquid crystal display, an electroluminescene display or a plasma display to expose the element directly or through an optical system.

As a light source for recording an image on the light-sensitive element, those light sources which are described in U.S. Pat. No. 4,500,626 such as a natural light, a tungsten lamp, a light-emitting diode, a laser source or CRT source may be used as described above.

In addition, imagewise exposure may also be conducted by using wavelength-converting elements wherein a non-linear optical material is combined with a coherent light source such as laser light. The term "non-linear optical material" as used herein means a material which can offer non-linear properties between polarization and an electric field when exposed to a strong photo-electric field such as a laser light, and inorganic compounds represented by lithium niobate, potassium dihydrogenphosphate (KDP), lithium iodate, and $BaB_2O_4$, nitroaniline derivatives, nitropyridine-N-oxide (POM), and compounds described in JP-A-61-53462 and JP-A-62-210432 are preferably used. As the form of the wavelength-converting elements, there are known single crystal light waveguide types and fiber types, both being usable.

As the aforesaid information, image signals obtained from a video camera, an electronic still camera, etc., TV signals represented by Japanese Television Signal Codes (NTSC), image information obtained by dividing an original into many pixels, and image signals produced by a computer represented by CG and CAD may be utilized.

The present invention is now illustrated in greater detail by reference to the following examples which, however, are not to be construed as limiting the present invention in any way.

Unless otherwise indicated, all percents, ratios, parts, etc. are by weight.

EXAMPLE 1

Dye-immobilizing elements were prepared as follows.

Dye-immobilizing elements R-1 to R-3 were prepared by using a paper support laminated with polyethylene and employing the fundamental constitution as shown in Table 1 with Element R-1 was provided with a support SR-1, Element R-2 was provided with a support SR-2, and Element R-3 was provided with a support SR-3. Supports SR-1 to SR-3 differed from each other in the basis weight of the base paper as shown in Table 2.

TABLE 1

| Dye-immobilizing elements R-1 to R-3 | | |
|---|---|---|
| Layer No. | Additive | Added Amount (g/m$_2$) |
| 3rd layer | Gelatin | 0.05 |
| | Silicone oil (1)* | 0.04 |
| | Surfactant (1)* | 0.001 |
| | Surfactant (2)* | 0.02 |
| | Surfactant (3)* | 0.10 |

TABLE 1-continued

|  |  |  |
|---|---|---|
|  | Matting agent (1)* | 0.02 |
|  | Guanidine picolinate | 0.45 |
|  | Water-soluble polymer (1)* | 0.24 |
| 2nd layer | Mordant (1)* | 2.35 |
|  | Water-soluble polymer (1)* | 0.21 |
|  | Gelatin | 1.40 |
|  | Water-soluble polymer (2)* | 0.60 |
|  | High-boiling solvent (1)* | 1.40 |
|  | Guanidine picolinate | 1.80 |
|  | Surfactant (4)* | 0.02 |
| 1st layer | Gelatin | 0.45 |
|  | Surfactant (3)* | 0.01 |
|  | Water-soluble polymer (1)* | 0.04 |
|  | Hardener (1)* | 0.30 |
|  | Support (SR1 to SR3) |  |
| 1st backing layer | Gelatin | 2.93 g |
|  | Hardener (1)* | 0.23 |
| 2nd backing layer | Gelatin | 0.44 |
|  | Silicon oil (1)* | 0.08 |
|  | Surfactant (4)* | 0.05 |
|  | Matting agent (2)* | 0.09 |
|  | Surfactant (5)* | 0.01 |

Silicone oil (1)*

$$CH_3-Si(CH_3)((CH_2)_{12}COOH)-O-(Si(CH_3)(CH_3)-O)_{30}-Si(CH_3)((CH_2)_{12}COOH)-CH_3$$

Surfactant (1)*

$C_nH_{2n+1}-C_6H_4-SO_3Na$ (n = about 12.6)

Surfactant (2)*

$C_8F_{17}SO_2NCH_2COOK$
       $|$
       $C_3H_7$

Surfactant (3)*

$$C_{11}H_{23}CONHCH_2CH_2CH_2N^+(CH_3)_2CH_2COO^-$$

Surfactant (4)*

$$CH_2COOCH_2CHC_4H_9(C_2H_5)$$
$$NaO_3S-CHCOOCH_2CHC_4H_9(C_2H_5)$$

Surfactant (5)*

$C_8F_{17}SO_2N(C_3H_7)-(CH_2CH_2O)_4-(CH_2)_4SO_4Na$

Water-soluble polymer (1)*
Sumikagel L5-H
(produced by Sumitomo Chemical Co., Ltd.)
Water-soluble polymer (2)*
Dextran (molecular weight; 70000)

Mordant agent (1)*

TABLE 1-continued

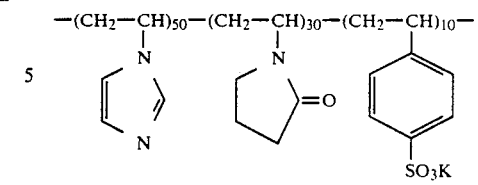

High-boiling solvent (1)* benzene-1,2-dicarboxylic acid di-$C_{12}H_{25}$ ester ($CO_2C_{12}H_{25}$, $CO_2C_{12}H_{25}$)

Hardener (1)*

$(CH_2)_4-(O-CH_2-CH(-O-)CH_2)_2$ (epoxide)

Matting agent (1)*
Silica
Matting agent (2)*
Benzoguanamine resin
(average radius of particle 15 μm)

TABLE 2

Supports SR1–SR3

| Layer | Formation | SR1 | SR2 | SR3 |
|---|---|---|---|---|
|  |  | Film Thickness (μm) | | |
| Subbing layer on surface side | Gelatin | 0.1 | 0.1 | 0.1 |
| PE Layer on surface side (glossy) | Low-density polyethylene (density: 0.923) 89.2 parts Surface-treated titanium oxide 10.0 parts Ultramarine 0.8 parts | 45.0 | 45.0 | 45.0 |
| Pulp layer | Woodfree paper (LBKP/NBKP = 1:1, density: 1.080) | 92.6 | 101.9 | 74.1 |
| PE Layer on back side (matt) | High-sensity polyethylene (density: 0.960) | 36.0 | 36.0 | 36.0 |
| Subbing layer on back side | Gelatine | 0.05 | 0.05 | 0.05 |
|  | Colloidal silica | 0.05 | 0.05 | 0.05 |
| Total |  | 173.8 | 183.1 | 155.3 |

The stiffness of supports SR1 to SR3 was determined using Taber's stiffness tester as the measuring instrument, and the results are shown in Table 3 below.

TABLE 3

Stiffness of supports SR1–SR3

| Support | Stiffness in Machine Direction | Stiffness in Transverse Direction |
|---|---|---|
| SR1 | 4.50 g · cm | 3.23 g · cm |
| SR2 | 6.04 g · cm | 3.55 g · cm |
| SR3 | 3.53 g · cm | 2.65 g · cm |

Various problems, including front-end folding or bending, of formed dye images which are encountered upon forming images on the dye-immobilizing elements R-1 to R-3 using the thermal-development-process image-forming machine shown in FIG. 1 are tabulated in Table 4.

TABLE 4

| Dye-immobilizing Element | Problem upon formation of image | |
|---|---|---|
| | Transfer Uneven-ness (number of sheets suffering transfer uneven-ness per 10 processed sheets) | Front-end Folding or Bending (number of sheets suffering folding or bending per 10 processed sheets) |
| R1 | 0 | 0 |
| R2 | 7 | 0 |
| R3 | 0 | 10 |

In the image formation on the above-described dye-immobilizing element, Sample 201 described in Example 3 of JP-A-62-247371 (to be referred to as light-sensitive element K-1) was used as the light-sensitive element, and the thermal-development-process image-forming machine shown in FIG. 1 was used as the testing machine.

The light-sensitive element and each of the above-described dye-immobilizing elements were set in place in the machine shown in FIG. 1. The light-sensitive element was imagewise exposed, 12 g/m² of water was fed thereto in solvent-applying section 8, then superposed on the dye-immobilizing element in superposing section 40 with the coated layers in contact with each other. Subsequently, the assembly was conveyed at 12 mm/second to thermally developing section 7 held at 90° C. to heat for 25 seconds, then separated into the two elements in delaminating section 9.

When the above-described procedures were conducted, Element R-2 created the problem that, after superposing on the light-sensitive element, the front end of the curled dye-immobilizing element collided with the heating and conveying roller and allowed air to get into the space therebetween, resulting in density unevenness (transfer unevenness) in the formed image due to superposition failure.

Element R-3 caused the problem that, after superposing on the light-sensitive element, the front end of the curled dye-immobilizing element was pressed by the heating and conveying roller due to the insufficient nerve (insufficient stiffness), resulting in the folding and bending of the front end of the dye-immobilizing element after image formation.

On the other hand, dye-immobilizing Element R-1 did not suffer the transfer unevenness and folding or bending of the front end, and was found to provide a color hard copy involving no troubles in viewing and in storage of the dye image after its formation.

While the present invention has been described in detail and with reference to specific embodiments thereof, it is apparent to one skilled in the art that various changes and modifications can be made therein without departing from the spirit and the scope of the present invention.

What is claimed is:

1. A photographic element, which is adapted for an image-forming process using a thermal-developing-process image-forming apparatus equipped with rollers for conveying photographic elements capable of forming images by thermal development, said photographic element comprising a support having a stiffness in the machine direction of 4.0 to 5.0 g.cm and a stiffness in the transverse direction of 2.9 to 3.4 g.cm.

2. The photographic element as set forth in claim 1, wherein said photographic element is a thermally developable light-sensitive element capable of giving an imagewise distribution of a mobile dye by thermal development.

3. The photographic element as set forth in claim 1, wherein said photographic element is a dye-immobilizing element for receiving a diffusible dye from a thermally developable light-sensitive element capable of giving an imagewise distribution of a mobile dye by thermal development.

4. The photographic element as set forth in claim 1, wherein said thermal-developing-process image-forming apparatus comprises at least a superposing section where a thermally developable light-sensitive element capable of giving a mobile dye by thermal development and a dye-immobilizing element are superposed on each other, a thermally developing and transferring section where the thermally developable light-sensitive element and the dye-immobilizing element are heated, and an imagewise distribution of the formed mobile dye is transferred, and a delaminating section where the thermally developable light-sensitive layer and the dye-immobilizing element are separated from each other, and said rollers are in the thermally developing and transferring section, and said photographic element is said dye-immobilizing element.

* * * * *